Figure 1:
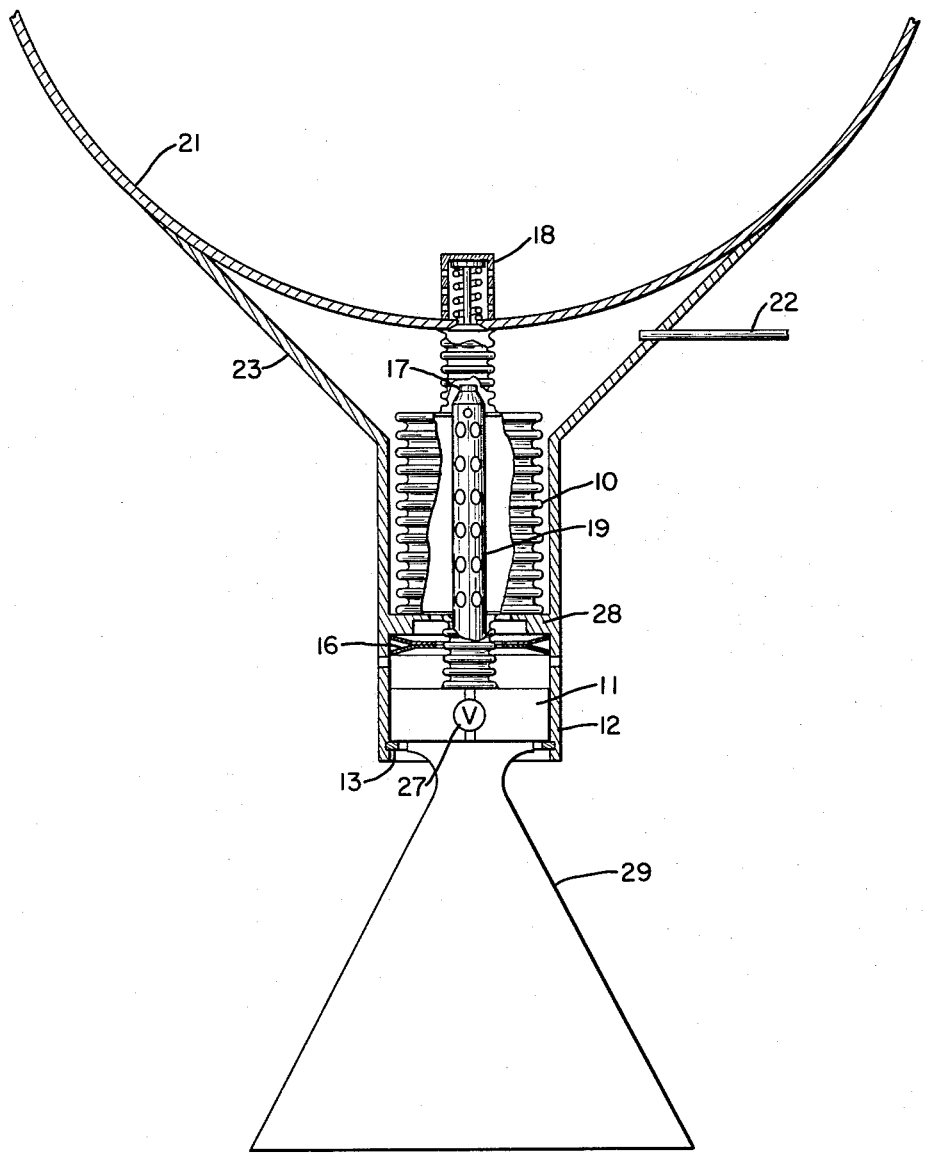

June 7, 1966  R. J. KENNY  3,254,486
ZERO GRAVITY START DEVICE
Filed May 31, 1963  2 Sheets-Sheet 1

INVENTOR.
RICHARD J. KENNY
BY Sheridan and Ross
ATTORNEYS

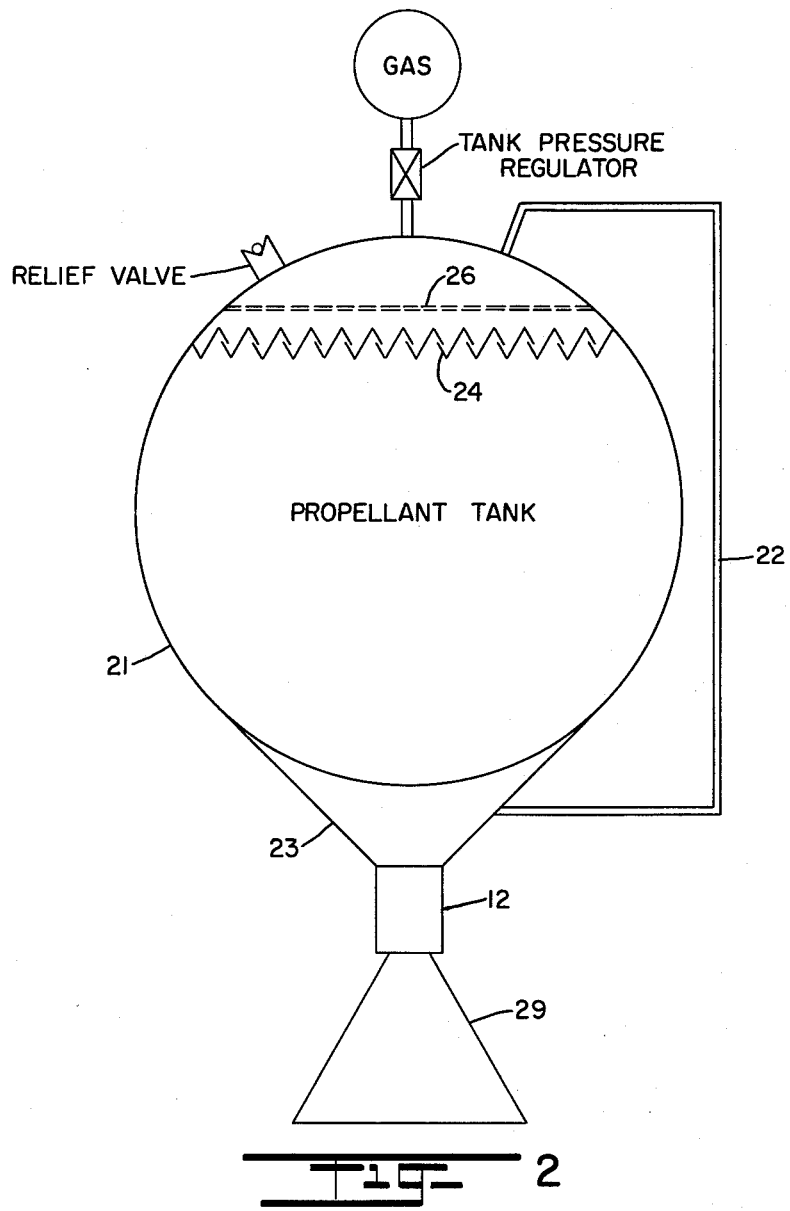

3,254,486
ZERO GRAVITY START DEVICE

Richard J. Kenny, Littleton, Colo., assignor to The Martin-Marietta Corporation, Baltimore, Md., a corporation of Maryland
Filed May 31, 1963, Ser. No. 284,552
4 Claims. (Cl. 60—35.6)

This invention relates to a system and method for starting a liquid fueled rocket or vehicle under substantially weightless conditions.

While the invention is illustrated in connection with a single liquid propellant tank, it is by no means limited to this application as it is equally applicable to dual liquid propellant systems using a liquid fuel and an oxidizer in separate tanks, for example. While a rocket or rocket propelled vehicle is in a substantially zero gravity flight path, liquid and vapor phases of the propellant liquids are present the propellant tanks in random fashion. Such dispersal of liquid and vapor phases in the propellant tanks and outlet lines presents a perplexing problem for pumping and metering of the propellant liquids. To insure the proper ignition and operation of the rocket engine in an approximately zero gravity environment, a propellant feed system and method are required which will deliver sufficient amounts of liquid propellants substantially free of any included vapor phases to the inlets of the supply pumps, or which will insure that vapor-free propellant is available at all times at the inlet of the combustion chamber for start or restart. Furthermore, the hardware employed in the system should be compact, low in weight and positive in operation.

Accordingly, it is an important object of this invention to provide a propellant feed system for starting a liquid fueled rocket at substantially zero gravity flight path conditions.

Another object of this invention is to provide such a system which is compact in space requirements and low in weight and in which high energy propellants are used for main propellant orientation so that the overall operation is accomplished in a highly efficient manner.

A further object of this invention is to provide a method and apparatus in a liquid fueled rocket system for insuring that vapor-free propellant is available for start and restart to initially bottom the liquid propellants in the proper position in the tanks to provide vapor-free propellant for sustained thrust of the rocket after start or restart.

Additional objects of this invention will become apparent from the following description which is given primarily for purposes of illustration and not limitation.

Stated in general terms, the objects of this invention are attained by a bellows type accumulator elongated and filled by liquid propellants during normal engine operation by forces transmitted through a movable injector plate. The propellant is trapped and stored vapor free in the device during periods of inactivity by a check valve at the bellows entrance and maintained at supply pressure by main propellant tank pressurization.

When the propellant tank is loaded with propellant under gravity conditions, the injector plate and a perforated tube, which is attached to the injector plate and extends upward into the bellows trap, is urged upwardly by a servicing tool through the interior of the bellows trap until a magnet, mounted on the upper end of the perforated tube attaches itself to the poppet member of the check valve. At this point, the perforated tube is backed off, or lowered, slightly so as to open the check valve. In this situation the interior of the bellows trap is filled with liquid propellant by allowing the entrained vapor to be vented to the main propellant tank. The exterior of the thus filled bellows trap is pressurized slightly after the servicing tool is removed.

Upon opening of an on-off feed valve, contained in the injector plate, liquid propellant is forced, in a zero gravity environment, into the combustion chamber of the rocket engine by the pressurization and bellows spring pressures. The rocket engine can, therefore, be ignited or re-ignited due to the pressurized supply of vapor free propellants available. After a portion of the stored propellants are consumed and initial thrust is developed, the liquid in the main propellant tanks is properly oriented at the tank bottom and normal propellant flow commences as the differential pressure across the check valve increases. During such normal flow, the bellows trap is automatically reloaded with liquid propellant as the engine thrust is increased to normal operating levels. When the rocket engine is shut off (the feed valve is closed) the check valve also is forced closed because of the decrease in differential pressure resulting from thrust termination.

A more detailed description of a specific embodiment of the zero gravity start device of this invention is given below with reference to the appended drawing, wherein:

FIG. 1 is a side elevational view, with portions cut away, showing a series arrangement of a check valve, bellows trap, perforated tube and an injector plate; and FIG. 2 is a schematic side elevational view showing a propellant storage tank in combination with the zero gravity start device.

Bellows trap 10 is initially loaded with liquid propellant on the ground. This operation elevates injector plate 11, consequently, compressing the lower small bellows. Injector plate 11 moves upwardly in chamber 12 from a retaining snap ring 13, past the normal full thrust position. This movement compresses Belleville spring 16 and brings a permanent magnet 17 into engagement with the check valve 18. Magnet 17 is attached to the upper end of the perforated belows actuator tube 19. After engagement of check valve 18 by magnet 17 is accomplished, perforated tube 19 is backed off or retracted slightly. This opens the check valve and entrained propellant vapor is ejected from bellows trap 10 while the trap is loaded with vapor-free liquid propellant.

After bellows trap 10 is thus loaded, magnet 17 is lowered by the downward movement of perforated tube 19, and check valve 18 is closed by a loaded spring contained therein. The lower end of perforated tube 19 is connected to injector plate 11 and the upper end of the perforated tube is attached to the upper portion of bellows trap 10, at the bottom of an upper smaller diameter extension of the bellows trap.

After propellant storage tank 21 is loaded with liquid propellant, the storage tank is pressurized with gas, as indicated in FIG. 2. The ullage pressure of pressurized storage tank 21 is used as the working medium in bellows trap 10 through a pressure balance line 22 (FIG. 2) which establishes communication between the storage tank and the bellows trap. Liquid propellant is prevented from entering the sealed thrust mount housing 23 of bellows trap 10, through communicating pressure balance line 22 by the use of a suitable liquid baffle 24 and a suitable zero gravity surface tension seive 26 installed in the dome of propellant storage tank 21.

During a zero gravity ignition, or reignition, operation, bellows trap 10 contains vapor-free propellant liquid at propellant tank ullage pressure. When feed valve 27, contained by injector plate 12, is opened, vapor-free liquid propellant expulsion through the feed valve takes place as a result of the external pressurization of bellows trap 10 and the spring force in the extended bellows. Perforated tube 19 moves downwardly, away from check valve 18 because the internal pressure and the spring force of bellows trap 10 are sufficient to overcome the small opposing force resulting from an initial low thrust engine operation. After sufficient total impulse is generated by the ignited engine to cause the liquid propellant in storage tank 21 to bottom out, the rocket engine can be sequenced for full thrust operation.

As the engine thrust overcomes the opposing pressure forces, check valve 18 opens and main propellant feed is achieved. Upon attaining full thrust, bellows trap 10 is automatically reloaded with liquid propellant. Bellows trap 10 is again elongated by the upward movement of perforated tube 19, which is attached at its lower end to the thrust mount 28. The travel of injector plate 11 is limited by Belleville spring 16, which prevents check valve 18 from being contacted by magnet 17 and held open.

When thrust is again terminated, vapor-free liquid propellant is again trapped in bellows trap 10 by check valve 18, as described above. The liquid propellant in bellows trap 10 is maintained under ullage pressure of propellant storage tank 21, ready for a reignition operation. Reignition is always achieved at a lower thrust level to achieve propellant bottoming out in propellant storage tank 21, before initiating full thrust engine operation. Such full thrust operation will again reload the bellows trap 10 with vapor-free liquid propellant. The initial thrust requirements of the device can be programmed into the particular start sequence of the engine to give the desired start transient. A normal shutdown sequence is anticipated in this device.

Instead of a permanent magnet 17, a mechanical latch can be used. Also, bellows trap arrangements separated from the thrust chamber 29, but connected to a thrust plate by mechanical linkages to operate in substantially the same manner as described above is within the contemplation of this invention. The above-described device of this invention can be used for one, two or more propellants, as desired.

Obviously, many other modifications and variations of the zero gravity start device of the present invention are possible in the light of the teachings given hereinabove. It is, therefore, to be understood that, within the scope of the appended claims, the invention can be practiced otherwise than as specifically described.

What is claimed is:

1. A device of the type described for starting a rocket engine in a substantially zero gravity environment which comprises a liquid propellant storage tank, check valve means mounted in an outlet of said tank for controlling propellant flow therefrom, trap means connected to said valve means for establishment of communication with said tank, means extending through said trap means for actuation of said check valve means, propellant injector means connected to an outlet of said trap means for receiving propellant therefrom, thrust chamber means connected to said injector means for injection of propellant from said injector means into the thrust chamber means, and feed valve means in said injector means for controlling flow of propellant from said trap means into said thrust chamber means.

2. A device of the type described for starting a rocket engine in a substantially zero gravity environment which comprises a liquid propellant storage tank, check valve means mounted in an outlet of said tank for controlling propellant flow therefrom, bellows trap means connected to said valve means for establishing communication with said tank, perforated tube means extending through said trap means for actuation of said check valve means, propellant injector means connected to an outlet of said trap means for receiving propellant therefrom, thrust chamber means connected to said injector means for injection of propellant from said injector means into said thrust chamber means, and feed valve means in said injector means for controlling flow of propellant from said trap means into said thrust chamber means.

3. A device of the type described for starting a rocket engine in a substantially zero gravity environment which comprises a liquid propellant storage tank, check valve means mounted in an outlet of said tank for controlling propellant flow therefrom, bellows trap means connected to said valve means for establishing communication with said tank, perforated tube means extending through said trap means for actuation of said check valve means, enclosure housing means mounted around said bellows trap means for providing a pressurized atmosphere therearound, pressure balance conduit means for establishing propellant vapor communication between said enclosure housing means and the ullage zone of said propellant storage tank, propellant injector means connected to an outlet of said trap means for receiving propellant therefrom, thrust chamber means connected to said injector means for injection of propellant from said injector means into said thrust chamber means, and feed valve means in said injector means for controlling flow of propellant from said trap means into said thrust chamber means.

4. A device of the type described for starting a rocket engine in a substantially zero gravity environment which comprises:
  a liquid propellant storage tank;
  check valve means mounted in an outlet of said tank for controlling propellant flow therefrom;
  trap means connected to said valve means for establishing communication with said tank;
  enclosure housing means mounted around said trap means for providing a pressurized atmosphere therearound;
  pressure balance conduit means for establishing propellant vapor communication between said enclosure housing means and the ullage zone of said propellant storage tank;
  propellant injector means connected to an outlet of said trap means for receiving propellant therefrom;
  thrust chamber means connected to said injector means for injection of propellant from said injector means into said thrust chamber means; and
  feed valve means in said injector means for controlling flow of propellant from said trap means into said thrust chamber means.

References Cited by the Examiner

UNITED STATES PATENTS

| | | |
|---|---|---|
| 2,496,711 | 2/1950 | Goddard. |
| 2,612,752 | 10/1952 | Goddard. |
| 2,873,577 | 2/1959 | Kenney et al. _____ 60—39.14 |

MARK NEWMAN, *Primary Examiner.*

SAMUEL LEVINE, *Examiner.*

D. HART, *Assistant Examiner.*